M. McC. SHAW.
FENDER FOR AUTOMOBILE TRUCKS.
APPLICATION FILED MAY 11, 1914.

1,248,935.  Patented Dec. 4, 1917.

Witnesses
M. P. McKee
G. Tracy

Inventor
M. M. Shaw

Alex. J. Wedderburn, Jr.
Attorney

UNITED STATES PATENT OFFICE.

MOSES McCORMICK SHAW, OF BRADDOCK, PENNSYLVANIA.

FENDER FOR AUTOMOBILE-TRUCKS.

1,248,935. Specification of Letters Patent. Patented Dec. 4, 1917.

Application filed May 11, 1914. Serial No. 837,780.

*To all whom it may concern:*

Be it known that I, MOSES M. SHAW, a citizen of the United States, residing at Braddock, in the county of Allegheny and State of Pennsylvania, have invented certain new and useful Improvements in Fenders for Automobile-Trucks, of which the following is a specification.

This invention relates to improvements in fenders and has for its object to provide a fender for automobile trucks, having in combination a scoop and independent wheel guards.

Another object is to provide a fender having a resiliently supported scoop.

Still another object is to provide a fender having a scoop and independent wheel guards, said scoop and guards being foldable.

With the above and other objects in view I have invented the device illustrated in the accompanying drawings in which—

Figure 1:
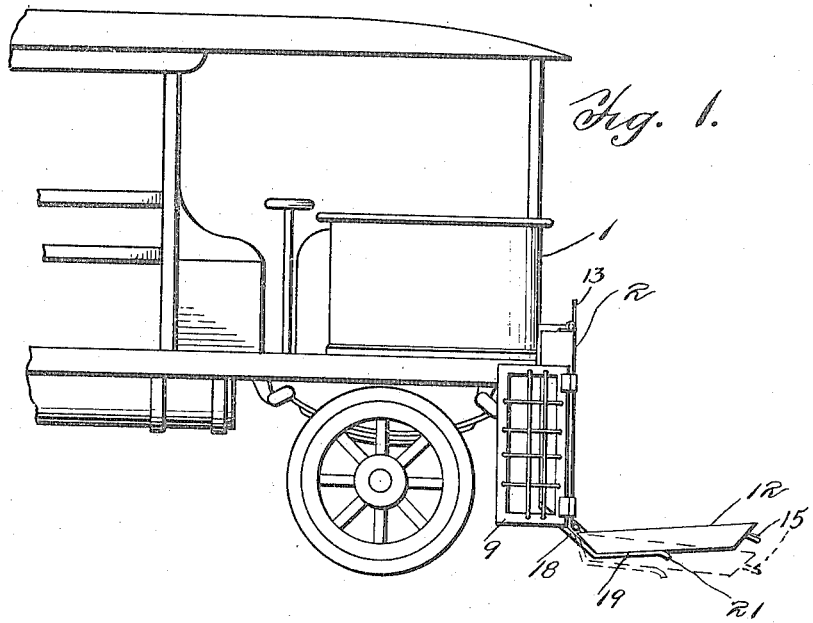
Figure 1 is a side elevation of my improved fender shown attached to an automobile truck.

Like reference characters designate like or corresponding parts throughout the different views, in which 1 indicates a vehicle to which is fixed a vertical guard or member 2, which is provided with a rear wall 3 formed of resilient wire mesh or other suitable material, if so desired. The wall 3 is supported on a frame formed by the sides 4, 5, 6 and 7. To the sides 4 and 6 are hingedly secured arcuately formed wheel guards 8 and 9, which are held normally open by means of the spring members 10 and 11, attached to said sides 4 and 6 and pressing against the guards 8 and 9. These guards may be folded within the member 2, against the tension of said springs 10 and 11, and may be held folded by means of the scoop 12, which is hinged to the member 3, and which may be held folded by means of the clamp 13, having an eye 14, adapted to receive the staple 15, on the frame member 16, of said scoop 12. Pivotally connected to the under portion of the frame member 7 are leaf spring members 17 and 18, having normally upwardly inclined supporting portions 19, which are adapted to bear against the resilient wire mesh bottom 20 of the scoop 12, and hold said scoop in a normally upwardly inclined position. However, the resiliency of these spring members 17 and 18, is such that they will give to any material weight which may be thrown upon the scoop, thereby absorbing the shock of the fall of an object upon the scoop.

Figure 2:
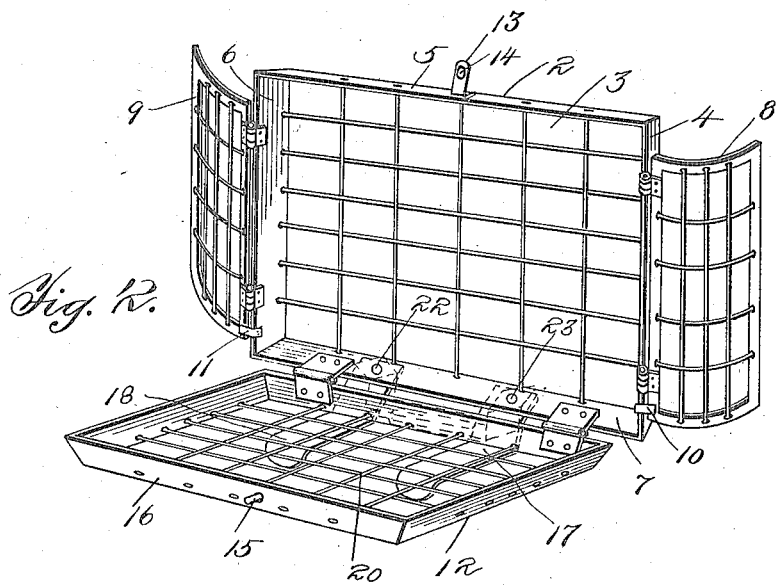
Fig. 2 is a perspective view of the fender detached from the truck.

When the scoop 12 is folded against the guard 2, the spring members 17 and 18 may be moved parallel with the member 7, as indicated in dotted lines in Fig. 2, so as not to project outwardly of said member when the fender is folded. The outer ends of the members 17 and 18 curve downwardly, so as not to catch in the wire mesh 20, and interfere with the operation of the fender. The spring members are pivoted at 22 and 23 to the member 7.

Having now described my invention, that which I claim as new and desire to secure by Letters Patent is:—

1. In a fender, a vertical guard, wheel guards hinged thereto, said wheel guards being spring actuated, and adapted to fold against said vertical guard, and a scoop hinged to said vertical guard.

2. In a fender, a vertical guard, wheel guards hinged thereto, said wheel guards being spring actuated, and adapted to fold against said vertical guard, a scoop hinged to said vertical guard, said scoop adapted to hold said wheel guards folded against said vertical guard.

3. In a fender, a vertical guard, wheel guards hinged thereto, said wheel guards being spring actuated, and adapted to fold against said vertical guard, a scoop hinged to said vertical guard, said scoop adapted to hold said wheel guards folded against said vertical guard, and leaf springs adapted to hold said scoop normally extended.

4. In a fender, a vertical guard, wheel guards hinged thereto, said wheel guards being spring actuated, said guards adapted to fold against said vertical guard, a scoop hinged to said vertical guard, said scoop adapted to hold said wheel guards folded against said vertical guard, leaf springs adapted to hold said scoop normally extended, said springs being fixed to said vertical guard.

5. In a fender, a vertical guard, wheel guards hinged thereto, said wheel guards being spring actuated, said guards adapted to fold against said vertical guard, a scoop hinged to said vertical guard, said scoop adapted to hold said wheel guards folded against said vertical guard, leaf springs adapted to hold said scoop normally extended, said springs being fixed to said vertical guard.

6. In a fender, a vertical guard, wheel guards hinged thereto, said wheel guards being spring actuated, said guards adapted to fold against said vertical guard, a scoop hinged to said vertical guard, said scoop adapted to hold said wheel guards folded against said vertical guard, leaf springs adapted to hold said scoop normally extended, said springs being fixed to said vertical guard and projecting under said scoop.

7. In a fender, a vertical guard, wheel guards hinged thereto, said wheel guards being spring actuated, said guards adapted to fold against said vertical guard, a scoop hinged to said vertical guard, said scoop adapted to hold said wheel guards folded against said vertical guard, leaf springs adapted to hold said scoop normally extended, said springs being fixed to said vertical guard, and projecting under said scoop and means whereby all of said guards and said scoop may be held folded together.

8. A fender of the character described consisting of a vertical guard, a pair of wheel guards hinged thereto, a scoop, said scoop being hinged to said vertical guard, and means for resiliently supporting said scoop, said means consisting of resilient brackets, said brackets being pivotally connected to said vertical guard, whereby they may be moved into parallel relation with said vertical guard.

9. A fender of the character described consisting of a vertical guard, a pair of wheel guards hinged thereto, a scoop, said scoop being hinged to said vertical guard and means for resiliently supporting said scoop, said means consisting of resilient brackets, said brackets being pivotally connected to said vertical guard, whereby they may be moved into parallel relation with said vertical guard, said wheel guards being spring-controlled.

10. A fender of the character described consisting of a vertical guard, a pair of wheel guards hinged thereto, a scoop, said scoop being hinged to said vertical guard, means for resiliently supporting said scoop, said means consisting of resilient brackets, said brackets being pivotally connected to said vertical guard, whereby they may be moved into parallel relation with said vertical guard, said wheel guards being spring-controlled, and said scoop being adapted to be folded against said wheel guards whereby they are held within said vertical guard.

11. In a fender, a rigid vertical guard and wheel guards hinged thereto, and a horizontal guard, adapted to hold said wheel guards folded against said vertical guard.

12. In a fender, a vertical guard and wheel guards hinged directly thereto, said wheel guards being spring controlled, and means for holding said wheel guards at substantially right angles to vehicle wheels.

In testimony whereof I affix my signature in presence of two witnesses.

MOSES McCORMICK SHAW.

Witnesses:
J. J. GRIFFITH,
R. A. PRICE.

Copies of this patent may be obtained for five cents each, by addressing the "Commissioner of Patents, Washington, D. C."